United States Patent
Szepessy et al.

(10) Patent No.: US 6,755,896 B2
(45) Date of Patent: Jun. 29, 2004

(54) METHOD OF CLEANING CRANKCASE GAS AND A GAS CLEANING SEPARATOR

(75) Inventors: Stefan Szepessy, Huddinge (SE); Ingvar Hällgren, Tumba (SE); Roland Isaksson, Grödinge (SE)

(73) Assignee: Alfa Laval Corporate AB, Lund (SE)

( * ) Notice: Subject to any disclaimer, the term of this patent is extended or adjusted under 35 U.S.C. 154(b) by 0 days.

(21) Appl. No.: 10/284,127

(22) Filed: Oct. 30, 2002

(65) Prior Publication Data

US 2003/0233939 A1 Dec. 25, 2003

(30) Foreign Application Priority Data

Jun. 24, 2002 (SE) .............................................. 0201982

(51) Int. Cl.[7] .............................................. B01D 45/14
(52) U.S. Cl. ............................ 95/270; 55/400; 55/406; 55/DIG. 19; 60/311
(58) Field of Search .................. 55/400, 406, DIG. 19; 494/46, 68, 70, 83; 95/269, 270; 60/311

(56) References Cited

U.S. PATENT DOCUMENTS

| | | | | |
|---|---|---|---|---|
| 2,094,058 A | * | 9/1937 | Bryson ........................ 384/196 |
| 2,709,500 A | * | 5/1955 | Carter .......................... 55/408 |
| 3,444,672 A | * | 5/1969 | Alsobrooks ................... 55/306 |
| 3,626,664 A | * | 12/1971 | Hoffstrom ..................... 95/270 |
| 4,342,546 A | * | 8/1982 | Rehfeld ........................ 418/47 |
| 5,505,684 A | | 4/1996 | Piramoon ..................... 494/16 |
| 5,779,619 A | * | 7/1998 | Borgstrom et al. ........... 494/56 |
| 5,954,035 A | | 9/1999 | Höfer et al. ................. 123/573 |
| 6,536,211 B1 | * | 3/2003 | Borgstrom et al. ........... 60/311 |

FOREIGN PATENT DOCUMENTS

| | | | |
|---|---|---|---|
| JP | 54-101773 | * | 8/1979 |
| WO | WO 99/56883 | | 11/1999 |
| WO | WO 01/36103 A1 | | 5/2001 |

* cited by examiner

*Primary Examiner*—Richard L. Chiesa
(74) *Attorney, Agent, or Firm*—McCormick, Paulding & Huber LLP

(57) ABSTRACT

For cleaning of crankcase gas produced by an internal combustion engine use is made of a centrifugal rotor, that is journalled in a frame through two axially separated bearings. The centrifugal rotor is caused to rotate by use of part of it also as a rotor of an electrical motor. The electrical motor has a stator, which is kept non-rotating and is charged with electric current for rotation of the centrifugal rotor, the centrifugal rotor being kept journalled during its rotation only in the two bearings.

10 Claims, 1 Drawing Sheet

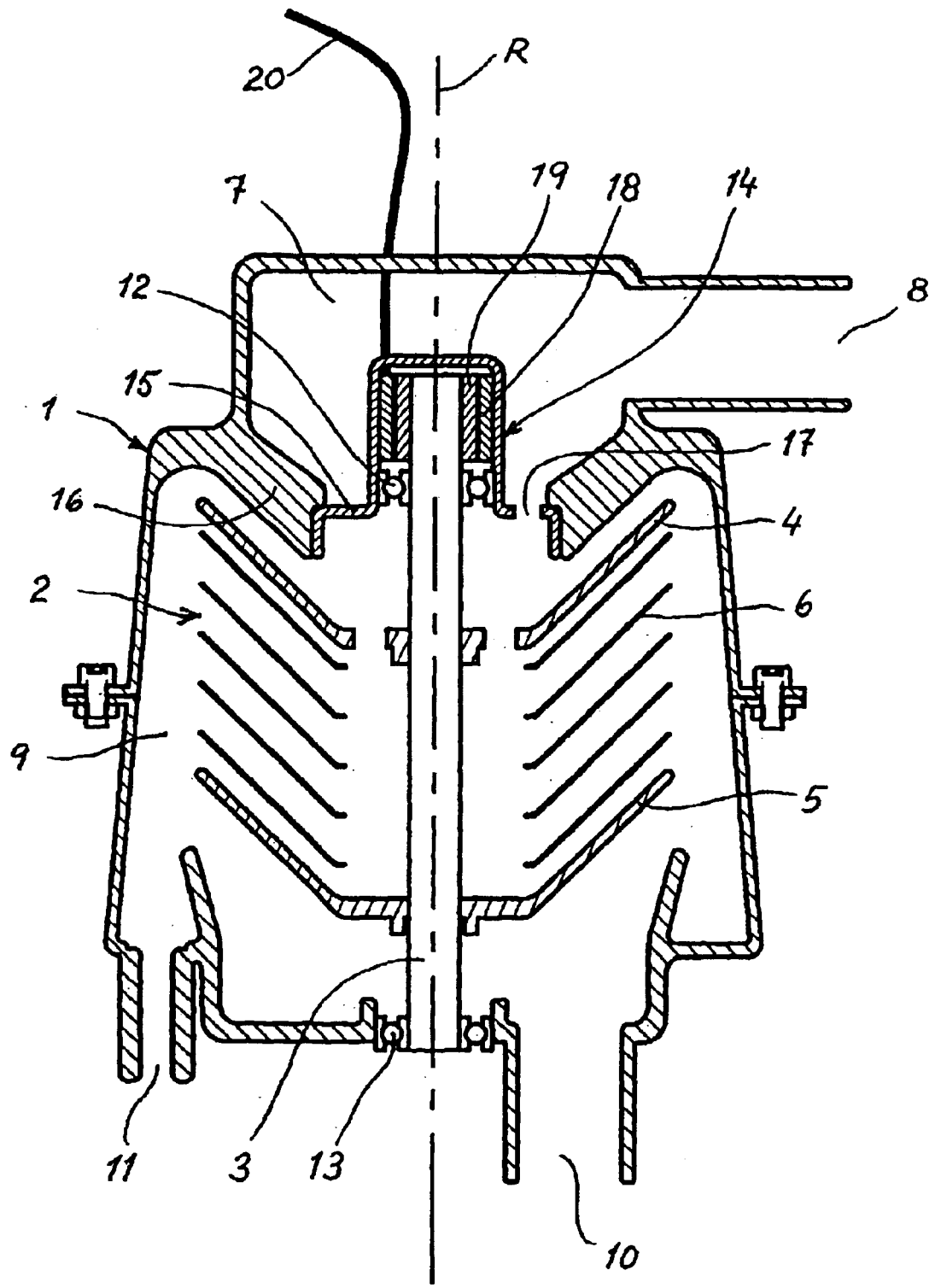

METHOD OF CLEANING CRANKCASE GAS AND A GAS CLEANING SEPARATOR

CROSS REFERENCE TO RELATED APPLICATIONS

This application is entitled to the benefit of, and incorporates by reference, essential subject matter disclosed in Swedish Patent Application No. 0201982-6 filed on Jun. 24, 2002.

The present invention relates to a method of cleaning crankcase gas produced by an internal combustion engine from particles, solid and/or liquid, suspended therein, the crankcase gas being caused to rotate around a rotational axis by means of a centrifugal rotor which for its operation is journalled in a supporting device at two bearing places situated axially spaced from each other.

A method of cleaning crankcase gas in this way has been described in WO 01/36103. A centrifugal separator is used having a centrifugal rotor, that includes a stack of conical separation discs and that is journalled at both its ends on the respective sides of this stack. The centrifugal rotor is rotatable in a stationary housing, the crankcase gas to be cleaned being caused to flow through thin interspaces between the separation discs from a central chamber in the rotor radially outwardly to a chamber surrounding the rotor in the stationary housing. A motor which may be of any suitable kind is coupled to the centrifugal rotor at one of the ends of the latter for rotation thereof in the stationary housing.

In recent years centrifugal separators of a relatively advanced kind, e.g. the aforementioned centrifugal separator, have been suggested for cleaning of crankcase gas. Centrifugal separators of this kind are relatively expensive to produce, which necessitates that a device for driving such a centrifugal separator must be made very cheap. One starting point for the driving of a centrifugal separator of this kind has been, therefore, that an already existing source of energy, that is continuously maintained by the combustion engine giving off the crankcase gas to be cleaned, should be usable in the easiest possible way for the driving. Thus, it has been suggested that a mechanical coupling should be established between one of the motor shafts, e.g. the crank shaft or the cam shaft, and the centrifugal rotor (see for instance U.S. Pat. No. 5,954,035). Another suggestion has been that an electrical motor should be used (see for instance WO 01/36103). A further suggestion has been that a pressure fluid generated by the combustion engine, e.g. part of the pressurized lubricating oil circulating in the motor, should be used for driving the centrifugal rotor through a simple turbine device (see for instance WO 99/56883).

In addition to the cost for the production of a driving device for the centrifugal rotor also other aspects on the choice of a driving device have to be considered. For instance, it has to be considered how driving energy may be transferred in the easiest and cheapest way to the centrifugal rotor. For these reasons, among others, it is today still unclear which type of driving device will be accepted in the future for a centrifugal rotor for the purpose here concerned, particularly in connection with combustion engines for propelling vehicles.

The object of the present invention is, in the first place, to provide a new method of cleaning crankcase gas by means of a centrifugal rotor, which method can give equipment as inexpensive as possible for the driving of the centrifugal rotor, including necessary devices for the transfer of driving energy from a source of energy to the centrifugal rotor, and which method can give a freedom as large as possible for the location of the centrifugal rotor in relation to the combustion engine.

This object can be achieved according to the invention by bringing a centrifugal rotor of the initially defined kind into rotation by using part of it also as a rotor of an electrical motor having also a stator, the stator being kept non-rotating and charged with electric current for rotation of the centrifugal rotor, while the centrifugal rotor is kept journalled during its rotation only at said two bearing places.

In accordance with the invention an electrical motor is used, which does not have separate bearings for the journalling of the rotor of the motor. The already present and necessary bearings for the centrifugal rotor are used for this journalling. Since the centrifugal rotor is intended for treatment of a gas and, therefore, may be made substantially completely of a very light material, the electrical driving motor may be made relatively small and, thereby, also its rotor may be made very light. For these reasons the combined centrifugal and motor rotor may be made very light and, thus, the cost for its journalling may be reduced to a minimum.

When the method according to the invention is practiced, the centrifugal rotor need not necessarily be formed so that gas to be cleaned has to flow through channels within the centrifugal rotor. Instead, the centrifugal rotor may be arranged to bring into rotation, within a stationary housing, gas that flows in a thin layer axially through an annular space formed between the centrifugal rotor and the stationary housing.

At each one of said two bearing places a bearing should be present for taking up radial forces during rotation of the centrifugal rotor. In case the centrifugal rotor is arranged for rotation around a vertical rotational axis, there may be present at one of the bearing places also a bearing for taking up axial forces. Possibly, an angular contact bearing may be used, adapted to take up radial as well axial forces.

The invention also concerns a gas cleaning separator, by means of which for instance the above defined method of cleaning crankcase gas may be performed. A separator of this kind includes a non-rotatable supporting device, a centrifugal rotor and an electrical motor for rotation of the centrifugal rotor around a preferably vertical rotational axis, the centrifugal rotor being arranged to be journalled in the supporting device through bearings situated only at two bearing places axially spaced from each other and having a rotor body with a separating device, that forms several passages through the rotor body for through flow of the gas to be cleaned. The separator is characterized in that the electrical motor includes a stator that is connected with said supporting device, and a rotor that is constituted by part of said centrifugal rotor and is journalled relative to the stator only in said bearings.

Said separating device may be of different kinds. The patent DE 48615 discloses some examples of such a device. Thus, the separation device may include several discs placed in a ring around the rotational axis of the centrifugal rotor, each disc extending both axially and from a small to a larger distance from said rotational axis in a direction crossing several radii starting from the rotational axis. The separation device alternatively may include one single disc that is winded spirally around said rotational axis in a way such that the gas to be cleaned may flow axially through a channel that, seen in a section perpendicular to the rotational axis, extends like a spiral. It is also possible to fill out a separation space in the centrifugal rotor with fibres, which between themselves form said passages through the rotor body. Preferably, however, the separation device includes a stack of conical separation discs arranged coaxially with said rotational axis.

Said supporting device is preferably constituted by part of a stationary frame, with which it is immovably connected. However, if this would prove suitable, the whole supporting device, may be turnably suspended from a stationary frame, so that it is free to perform a pendulum movement relative to the frame.

The journalling of the centrifugal rotor in the supporting device may be of different kinds. Thus, the two bearing places may be situated axially on one side of the rotor body. In a preferred embodiment of the invention the rotor body is arranged axially between the two bearing places, however. In this case the rotor of the electrical motor is preferably situated on one side and the rotor body situated on the other side of one of the bearing places.

If desired, one part of said rotor body may constitute the aforementioned part of the centrifugal rotor, that is used as a rotor in the electrical motor. The stator of the motor then may surround or be surrounded by this part of the rotor body at a larger or smaller radius, for instance at a radius half as big as the biggest radius of the rotor body. In a particular embodiment the main part of the rotor body may be situated between the two bearing places, whereas part of the rotor body may surround and extend axially past one bearing place and support the rotor of the electrical motor in an area that is not situated at the same side of this bearing place as the main part of the rotor body.

The electrical motor as defined above may principally be of any suitable kind, for instance a direct-current motor or an alternate-current motor (synchronous motor or asynchronous motor). Preferably, a synchronous motor is used having a rotor that includes permanent magnets.

The invention will be described more in detail in the following with reference to the accompanying drawing, in which there is shown a longitudinal section through a gas cleaning separator, by means of which cleaning of crankcase gas in accordance with the invention may be performed.

The gas separator in the drawing has a stationary housing 1, in which a centrifugal rotor 2 is rotatable around a vertical rotational axis R. The centrifugal rotor 2 has a central shaft 3 and a rotor body connected therewith. The rotor body includes an upper conical end wall 4 and a lower conical end wall 5 and a large number of conical separation discs 6 arranged axially therebetween. The separation discs 6, suitably made of plastic, are provided on their one sides with several spacing members (not shown) abutting against adjacent separation discs and creating interspaces between the separation discs. The upper end wall 4 and each one of the separation discs 6 are provided at their central parts with a number of through holes distributed around the rotational axis R. Through these holes the interspaces between the separation discs 6 may communicate with an inlet chamber 7 situated in the upper part of the housing 1, this chamber having an inlet 8 for gas to be cleaned in the separator.

Around the centrifugal rotor 2 there is formed in the stationary housing 1 an annular chamber 9 that has a first outlet 10 for cleaned gas and a second outlet 11 for solid and/or liquid particles having been separated from the gas.

The centrifugal rotor 2 is rotatably suspended from the housing 1 in an upper bearing 12 and a lower bearing 13, said bearings being arranged one on each side of the rotor body. The upper bearing 12 is supported by a cap 14 which by a cylindrical part surrounds an upper end portion of the centrifugal rotor shaft 3, said upper end portion being situated above the upper bearing 12. The cap 14 also has an annular plain portion 15, through which the cap is supported by a partition 16 in the stationary housing 1. The plain annular portion 15 of the cap is provided with through holes 17, through which the inlet chamber 7 communicates with the interior of the centrifugal rotor 2.

Above the upper centrifugal rotor bearing 12 the cap 14 supports on its inside, around said end portion of the centrifugal rotor shaft 3, a stator 18 belonging to an electrical motor. A rotor 19 belonging to this motor is supported by the end portion of the centrifugal rotor shaft 3. A narrow annular slot is formed between the motor stator 18 and the motor rotor 19. A wire 20 for charging the electrical motor with current extends from above into the housing 1 and further through the cap 14 in to the stator 18 of the motor.

The cleaning device shown in the drawing operates in the following way.

While the centrifugal rotor 2 is kept in rotation by supply of current to the electrical motor 18, 19, contaminated gas, e.g. crankcase gas from the crankcase of an internal combustion engine, is supplied to the gas inlet 8. This gas is conducted further through the inlet chamber 7 into the central part of the centrifugal rotor 2 and from there into and through the interspaces between the separation discs 6. As a consequence of the rotation of the centrifugal rotor the gas is brought to rotate, whereby it is pumped further on radially outwardly through said interspaces.

During the rotation of the gas in said interspaces solid or liquid particles suspended in the gas are separated therefrom. The particles settle on the insides of the separation discs 6 and slide or run after that radially outwardly thereon. When the particles and/or liquid drops have reached out to the outer edges of the separation discs 6, they are thrown away from the rotor and hit the surrounding wall of the surrounding stationary housing 1. The particles continue downwardly along this wall and leave the housing through the particle outlet 11, whereas the gas freed from particles and exiting into the chamber 9 around the centrifugal rotor 2 leaves the housing 1 through its gas outlet 10.

As can be seen, the described electrical motor has no bearings of its own, through which its rotor would be rotatably journalled in its stator. Instead, the two bearings 12 and 13, through which the centrifugal rotor 2 is journalled in the stationary housing 1, are utilized for the journalling of the rotor of the motor.

In the shown embodiment of the invention the stationary housing 1 constitutes a stationary supporting device for the centrifugal rotor as well as for the rotor 19 of the motor. If desired, the centrifugal rotor 2 and its two bearings 12 and 13 may be suspended from a non-rotatable but still movable supporting device, which in turn is supported movably by the stationary housing 1. For instance, a movable supporting device of this kind may be suspended in the housing 1 through a half-spherical body resting in a half-spherical bowl that is formed in an upwardly facing surface on part of the housing. The supporting device then may perform pendulum movements relative to the stationary housing without being rotatable relative thereto around the rotational axis R.

As many parts as possible of the centrifugal rotor are suitably made of some light material, such as plastic. Thus, preferably, the two end walls 4 and 5 and the separation discs 6, but also members (not shown) connecting these parts of the centrifugal rotor with its central shaft 3, are made of plastic. Possibly even the shaft 3 may be made of plastic, e.g. fibre reinforced plastic, but it may prove necessary to produce the shaft out of metal in order to give it the necessary stiffness.

At least one of the shown bearings 12 and 13 may be formed as a sliding bearing.

Both of the bearings 12 and 13 are intended to take up radial forces. Suitably, one of them is formed as an angle contact bearing, so that it can take up even necessary axial forces in order to support the centrifugal rotor 2. If it would be possible and the costs for the two bearings 12 and 13 could be substantially reduced thereby, the central shaft 3 of the centrifugal rotor may be somewhat extended downwardly and rest directly on a separate support, if this upon rotation of the centrifugal rotor 2 results in very small frictional forces. In an arrangement of this kind the support taking up axial forces is not to be considered as one of the two bearings defined in the subsequent claims, if it takes up substantially only axial forces.

By means of a control equipment (not shown) the rotational speed and thereby the cleaning efficiency of the centrifugal rotor may be controlled in a suitable way, stepwise or continuously, so that a required cleaning of the supplied gas is obtained.

In the shown example the centrifugal rotor 2 for the gas cleaning is provided with conical separation discs 6 of a conventional kind. However, the invention is not limited to a centrifugal rotor of precisely this kind but may be used in connection with any suitable centrifugal rotor for freeing a gas from particles suspended therein.

An electrical motor of the kind shown in the drawing may alternatively be arranged around an extension of the shaft 3 below the lower bearing 13. It is also possible to arrange the motor in a space axially between one of the bearings 12, 13 and the rotor body itself. Possibly, it may be necessary, for obtainment of a turning moment of a desired magnitude for driving the centrifugal rotor 2, to give both the rotor and the stator of the electrical motor a larger diameter than that shown in the drawing. If so, a part of the upper or lower centrifugal rotor end wall 4 or 5 can be used as a rotor of the electrical motor. It is also possible to form the motor rotor and stator as annular plain or conical bodies arranged axially opposite to each other. Even an electrical motor having a disc-formed circular rotor and a stator formed so that it is situated axially on both sides of the rotor may be used.

What is claimed is:

1. A method of cleaning crankcase gas produced by an internal combustion engine from particles, solid and/or liquid, suspended therein, the crankcase gas being caused to rotate about a rotational axis (R) by means of a centrifugal rotor, which for its operation is journalled in a supporting device at two bearing places axially spaced from each other, characterized by causing the centrifugal rotor to rotate by using part of it also as a rotor of an electrical motor, which motor also has a stator, said stator being kept non-rotating and charged with an electric current for rotation of the centrifugal rotor, while the centrifugal rotor is kept journalled during its rotation only at said two bearing places.

2. A method according to claim 1, including using a part of the centrifugal rotor, which is situated axially on one side of both of said bearing places, as a rotor of the electrical motor.

3. A method according to claim 1, including causing the centrifugal rotor to rotate about a substantially vertical rotational axis (R).

4. A gas cleaning separator for cleaning of gas from particles, solid and/or liquid, suspended therein, including a non-rotatable supporting device, a centrifugal rotor and an electrical motor for rotation of the centrifugal rotor about a rotational axis (R), the centrifugal rotor
being arranged to be journalled in the supporting device through bearings situated at only two bearing places axially spaced from each other and
having a rotor body with a separation device that forms several passages through the rotor body for through flow of the gas to be cleaned, characterized in that
the electrical motor includes a stator, that is connected with said supporting device, and a rotor, that is constituted by part of said centrifugal rotor and that is journalled relative the stator only in said bearings.

5. A gas cleaning separator according to claim 4, in which at least the main part of the rotor body is arranged axially between said two bearing places.

6. A gas cleaning separator according to claim 5, in which the rotor of the electrical motor is situated on one side and at least the main part of the rotor body is situated on the other side of one of said bearing places.

7. A gas cleaning separator according to claim 4, in which said supporting device constitutes part of a stationary frame, with which the supporting device is immovably connected.

8. A gas cleaning separator according to claim 4, in which the centrifugal rotor is journalled for rotation about a substantially vertical rotational axis (R).

9. A gas cleaning separator according to claim 4, in which said separation device includes a stack of conical separation discs, which are arranged coaxially with said rotational axis (R).

10. Use of a gas cleaning separator according to claim 4 for freeing crankcase gas produced by an internal combustion engine from particles suspended in the crankcase gas.

* * * * *